Patented Oct. 24, 1950

2,527,481

UNITED STATES PATENT OFFICE 2,527,481

REFINING OF VEGETABLE WAX POWDER

Herbert F. Johnson and Elbert S. McLoud, Racine, Wis., assignors to S. C. Johnson & Son, Inc., Racine, Wis.

No Drawing. Application May 15, 1948, Serial No. 27,354

6 Claims. (Cl. 209—173)

This invention relates to the manufacture of raw material wax. More specifically, it relates to an improved process for removing known waxy matter from crude vegetable wax powder.

Many vegetable waxes such as esparto grass wax, carnauba wax and ouricury wax are removed from the plants by mechanical means and are, therefore, in the form of crude wax powder containing small particles of crude wax together with particles of other vegetable matter. In the case of carnauba wax, the leaves are cut from the carnauba palm and allowed to dry. The wax largely remains inclosed in the crevices of the dry and shrunken leaves. When the wax powder is removed from the leaves, a large amount of leafy matter becomes mingled with the wax particles. This leafy matter is also in powdered form of a particle size, shape and mass comparable to that of the wax powder from which it can scarcely be distinguished.

Various methods have been proposed for the removal of this leafy matter, or borra as it is known in Brazil. One of the most successful of these methods, which is now in commercial use, is that described in U. S. Patent to Johnson, Steinle and Gardiner No. 2,275,630. By this method the crude vegetable wax powder is screened through one or more screens of about 40 to 60 mesh, and the fines of the screening operation, which contain the wax, are subjected to a further treatment in a centrifugal air flotation separator whereby additional leafy matter or borra may be reduced from its original content of 20–35% down to a minimum of 12%.

Although the above process has contributed considerably to the production of light-colored wax, nevertheless, the amount of leafy matter or borra which remains tends to darken the wax upon subsequent melting.

Now in accordance with our invention, we have developed an improved process for removing leafy matter or borra from crude vegetable wax powder. This process, which is limited to the treatment of crude vegetable wax powder which has not been melted in the production thereof, comprises contacting crude vegetable wax powder with water, agitating the wax-water mixture sufficiently to wet the wax, then allowing the mixture to remain quiescent until a wax layer is formed on the surface of the water, and recovering the powdered wax from the wax layer.

Now having indicated in a general way the nature and purpose of this invention, the following examples will illustrate the invention. It is to be understood, however, that such examples are presented merely as illustrations of the invention and are not to be construed as limiting the same. In the examples the ingredients are given in parts by weight unless otherwise indicated.

Example 1

Two hundred parts of crude carnauba wax powder, prepared by the method described in U. S. Patent No. 2,275,630 and containing about 15–18% of leafy matter or borra, was charged into an open vessel. The wax powder was thoroughly wet with 520 parts of water with the aid of mechanical agitation. After the wax had been thoroughly wet, a liquid slurry was formed by contacting the wax-water mixture with 1560 additional parts of water. This slurry was allowed to remain quiescent in the vessel for about three hours. A wax layer was formed on the surface of the slurry and the borra separated and settled to the bottom of the vessel. The wax layer was removed and placed in a permeable basket centrifuge. This wax layer contained about 30% wax and 70% water. The centrifuge was operated for approximately 30 minutes. This wax cake, after centrifuging, had a moisture content of about 40%. The wax was then removed from the centrifuge, broken up into small lumps and air-dried in open trays. The borra content of the resulting dried wax powder was reduced to about 4%.

Example 2

Two hundred parts of dry crude carnauba wax powder, prepared by the method described in U. S. Patent No. 2,275,630 and containing about 15–18% of borra, was charged into an open vessel and 2,080 parts of water added. No agitation was provided and the crude wax powder was not wet by the water. The crude wax powder rose to the surface of the liquid. The mixture was allowed to stand for three hours and at the end of this time there was no appreciable separation of borra.

Example 3

Two thousand eighty parts of water were charged into an open vessel provided with mechanical agitation. The agitation was commenced and 200 parts of dry crude carnauba wax powder, substantially the same as that of Example 1, were added while the agitation was continued at a rate sufficiently slow so that the wax introduced into the vessel was thoroughly wet before additional wax was added. After the wax had all been thoroughly wet, agitation was stopped and the mixture was allowed to remain quiescent in the vessel for about three hours. A wax layer formed on the surface of the liquid and the borra separated and settled to the bottom of the vessel. The wax layer was removed and treated in accordance with the procedure of Example 1. The borra content of the resulting wax powder was reduced to about 4%.

*Example 4*

Forty parts of dry crude carnauba wax powder, prepared by the method described in U. S. Patent No. 2,275,630 and containing about 13% of borra, was charged into an open vessel with 104 parts of water. The wax was thoroughly wet by mechanical agitation and 312 additional parts of water were added. The mixture was allowed to remain quiescent in the vessel for about 1.5 hours. A wax layer was formed on the surface of the liquid and the borra separated and settled to the bottom of the vessel. The wax layer was treated in accordance with Example 1. The borra content of the resulting dry wax powder was 7.08%.

In the above examples there has thus been illustrated our improved process for removing leafy matter or borra from crude vegetable wax powder. Both Examples 1 and 3 illustrate the treatment of dry crude vegetable wax powder having a borra content of 15–18% which upon treatment was reduced to approximately 4%.

It will be noted in Example 2 that no appreciable separation of the borra took place. This was due to the fact that the dry crude vegetable wax powder was not thoroughly wet. This wetting of the surface of the dry crude vegetable wax powder is very essential since without it little separation of the borra can be achieved by water flotation. The definition of the word "wetting" appears on page 908 of Hackh's Chemical Dictionary and is as follows: "The adhesion of a liquid on to a surface." As shown in Examples 1 and 3, it is preferred to premix the dry crude vegetable wax powder with at least 2½ times its weight of water and then mechanically agitate the mixture until thorough wetting is achieved. However, it should be pointed out, as illustrated in Example 4, that if desired, the wax may be added directly to a large body of water, but care should be taken that the vessel is provided with mechanical agitation and the wax added only at such rate that it can be thoroughly wet as it is introduced into the vessel. If excessive wax is placed in the vessel without becoming thoroughly wet, it will ride upon the surface of the liquid and efficient separation of borra from this portion will not be achieved.

Ordinarily in carrying out this process, cold water or water of around 20–25° C. may be used. The use of hot water or water of more than 70° C. sometimes results in emulsification of the wax in the water and interferes with an efficient separation of the borra from the wax. Therefore, the use of water of a temperature of not more than 70° C. is recommended.

While in the examples the total volume of water to wax is about 10:1 by weight, it should be realized that this ratio may be varied. While it is recommended that at least 10 parts of water to 1 part of wax by weight be used, the ratio of water to wax may be increased over that amount, but the addition of excessive amounts of water provides additional recovery problems.

It has been found that a ratio of about 2½ parts of water per part of wax by weight provides adequate water for wetting. Less than this amount will result in incomplete wetting and thus reduce the efficiency of the separation of the borra.

In the examples, the time the mixture is allowed to remain quiescent to allow the wax particles to form a wax layer on the surface of the water and the borra to settle has been shown as from 1.5 hours to 3 hours. It will be understood that this time can be varied within a wide range, although, as illustrated in Example 4, the efficiency of the process is affected by the failure to allow the mixture to stand quiescent the length of time shown in Example 1. It is recommended that a settling time of at least 1.5 hours be allowed and that, if possible, at least three hours be allowed, although the wax layer may be removed as formed, if desired.

It should be realized that a continuous operation can be accomplished by a gradual introduction of the wax-water mixture to additional water and a gradual withdrawal of the borra and wax layer.

While the examples have illustrated the separation of leafy matter or borra from crude carnauba wax powder, it will be understood that this process is equally applicable to other vegetable wax powders such as esparto grass wax and ouricury wax which are obtained from the plant fibers in the form of a powder.

In Example 1, the moisture content of the wax layer was shown as about 70%. This will vary over a considerable range from a quite firm thick wax to a creamy fluid. The reduction in moisture content from 70% to 40% by centrifugal or other filtration, as shown in Example 1, was sufficient to open the capillaries of the wax powder so that rapid air drying could be achieved.

By the practising of our invention, a light-colored wax is obtained which greatly increases the commercial uses of the vegetable wax. It is anticipated that the dry vegetable wax powder will be treated with adsorbents and melted, thus obtaining a wax of sufficient lightness to eliminate the necessity of bleaching with chemicals which are well known in the art. While chemical bleaching agents often provide a lightness of color, the resulting alternation of the structural and chemical nature of the original wax is detrimental where the particular characteristics of the original wax are desired.

We claim:

1. A process for purifying crude vegetable wax powder, which has not been melted in the production thereof, comprising contacting crude vegetable wax powder with water of a temperature of not more than 70° C., the ratio between said wax and water being at least 2½ parts of water per part of wax, wetting said crude vegetable wax powder by agitating in said water, allowing said mixture to remain quiescent for a period of at least an hour and a half until a wax layer is formed on the surface of said water, and recovering powdered wax from said wax layer.

2. A process for purifying crude carnauba wax powder, which has not been melted in the production thereof, comprising contacting crude carnauba wax powder with water of a temperature of not more than 70° C., the ratio between said wax and water being at least 2½ parts of water per part of wax, wetting said crude carnauba wax powder by agitating in said water, allowing said mixture to remain quiescent for a period of at least an hour and a half until a wax layer is formed on the surface of said water, and recovering powdered wax from said wax layer.

3. A process for purifying crude vegetable wax powder, which has not been melted in the production thereof, comprising contacting crude vegetable wax powder with water of a temperature of not more than 70° C., the ratio between said wax and water being at least 2½ parts of water per part of wax, wetting said crude vegetable wax powder by agitating in said water, increasing the amount of water until a liquid slurry is formed, allowing said liquid slurry to remain quiescent for a period of at least an hour and a half until a wax layer is formed on the surface of said liquid, and recovering powdered wax from said wax layer.

4. A process for purifying crude carnauba wax powder, which has not been melted in the production thereof, comprising contacting crude carnauba wax powder with water of a temperature of not more than 70° C., the ratio between said wax and water being at least 2½ parts of water per part of wax, wetting said crude carnauba wax powder by agitating in said water, increasing the amount of water until a liquid slurry is formed, allowing said liquid slurry to remain quiescent for a period of at least an hour and a half until a wax layer is formed on the surface of said liquid, and recovering powdered wax from said wax layer.

5. A process for purifying crude vegetable wax powder, which has not been melted in the production thereof, comprising contacting crude vegetable wax powder with water of a temperature of not more than 70° C., the ratio between said wax and water being at least 2½ parts of water per part of wax, wetting said crude vegetable wax powder by agitating in said water, allowing said mixture to remain quiescent for a period of at least an hour and a half until a wax layer is formed on the surface of said water, recovering said floating wax from said surface, and removing powdered wax therefrom.

6. A process for purifying crude carnauba wax powder, which has not been melted in the production thereof, comprising contacting crude carnauba wax powder with water of a temperature of not more than 70° C., the ratio between said wax and water being at least 2½ parts of water per part of wax, wetting said crude carnauba wax powder by agitating in said water, allowing said mixture to remain quiescent for a period of at least an hour and a half until a wax layer is formed on the surface of said water, recovering said floating wax from said surface, and removing powdered wax therefrom.

HERBERT F. JOHNSON.
ELBERT S. McLOUD.

REFERENCES CITED

The following references are of record in the file of this patent:

UNITED STATES PATENTS

| Number | Name | Date |
|---|---|---|
| 931,120 | Hunicke | Aug. 17, 1909 |
| 1,842,002 | Zschoch et al. | Jan. 19, 1932 |
| 2,136,281 | Dickinson | Nov. 8, 1938 |
| 2,310,492 | Nagelvoort | Feb. 9, 1943 |
| 2,434,649 | Gruskin | Jan. 20, 1948 |

OTHER REFERENCES

Bennett, Commercial Waxes (1944), Chem. Pub. Co., pages 74 to 76. (Copy in Division 63.)